United States Patent
Takahashi

(10) Patent No.: US 8,173,951 B2
(45) Date of Patent: May 8, 2012

(54) OPTICAL ENCODER COMPRISING A MAIN AND REFERENCE LIGHT RECEIVING PORTIONS WITH A THREE-PHASE SIGNAL GENERATION FOR DETECTING DISPLACEMENT AND DIRECTION OF DISPLACEMENT OF AN INCREMENTAL GRATING TRACK

(75) Inventor: Tomotaka Takahashi, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 466 days.

(21) Appl. No.: 12/585,394

(22) Filed: Sep. 14, 2009

(65) Prior Publication Data
US 2010/0072348 A1    Mar. 25, 2010

(30) Foreign Application Priority Data
Sep. 19, 2008    (JP) ................................. 2008-240216

(51) Int. Cl.
*G01D 5/34*    (2006.01)
*G01D 5/36*    (2006.01)
(52) U.S. Cl. ................................ 250/231.16; 250/237 G
(58) Field of Classification Search .............. 250/231.13, 250/237 G, 214.1, 214 R, 239, 216, 221, 250/231.1, 231.16, 231.14, 231.17; 356/499, 356/521, 615–619, 620, 621; 341/11–13
See application file for complete search history.

(56) References Cited

U.S. PATENT DOCUMENTS

| | | | | |
|---|---|---|---|---|
| 4,943,716 A | * | 7/1990 | Ichikawa et al. | 250/231.16 |
| 5,026,164 A | * | 6/1991 | Ichikawa | 356/619 |
| 5,127,035 A | * | 6/1992 | Ishii | 377/24 |
| 7,348,544 B2 | * | 3/2008 | Atsuta et al. | 250/231.13 |
| 7,348,546 B2 | * | 3/2008 | Schoser et al. | 250/231.13 |
| 2004/0222365 A1 | * | 11/2004 | Tobiason | 250/231.13 |
| 2009/0027692 A1 | * | 1/2009 | Zwilling et al. | 356/617 |

FOREIGN PATENT DOCUMENTS

| | | |
|---|---|---|
| EP | 0 207 121 B1 | 1/1987 |
| JP | 2007232681 A * | 9/2007 |
| JP | A-2008-503745 | 2/2008 |
| JP | 2008232705 A * | 10/2008 |
| WO | WO 2005/124282 A2 | 12/2005 |

* cited by examiner

*Primary Examiner* — Que T Le
*Assistant Examiner* — Jennifer Bennett
(74) *Attorney, Agent, or Firm* — Oliff & Berridge, PLC

(57) ABSTRACT

In an optical encoder for measuring relative displacement, a scale 10 has a reference mark 14 composed of a reflection slit formed on at least one point of an incremental track 12, a detection portion (20) has a light irradiation portion (24), main light receiving portions 30*a*, 30*b*, 30*ab* and 30*bb* that are disposed at the surrounding centering around the corresponding light irradiation portion and output incremental signals four phases of which are different from each other, and a pair of reference signal light receiving portions 32*z* and 32*zb* that are disposed in the direction perpendicular to the length measurement direction using the light irradiation portion as the center of point symmetry, and a signal processing portion 40 has a three-phase signal generation portion 48, a quadrature sine wave signals generation portion 50, a direction judgment circuit 56, an internal period counter 58, and a reference signal processing portion 60, thereby bringing about a microsized optical encoder capable of detecting the reference.

14 Claims, 13 Drawing Sheets

Diffraction area on scale
(Length measurement point)

Fig. 3
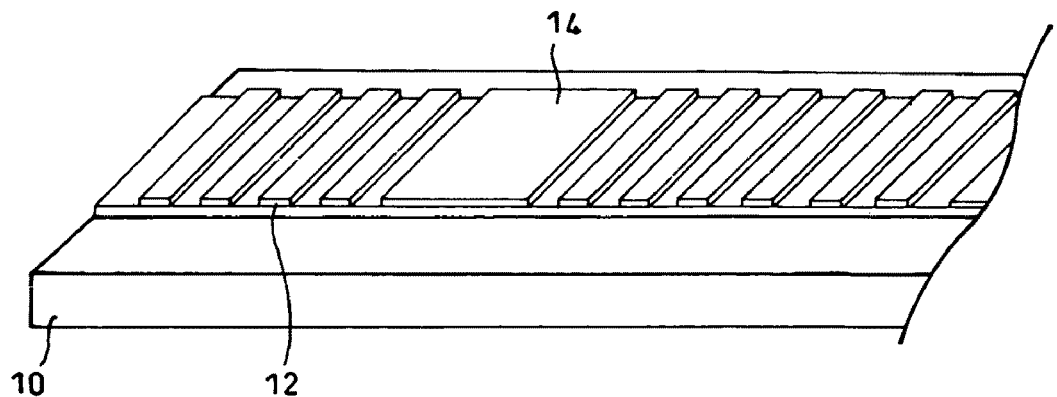
Fig. 4
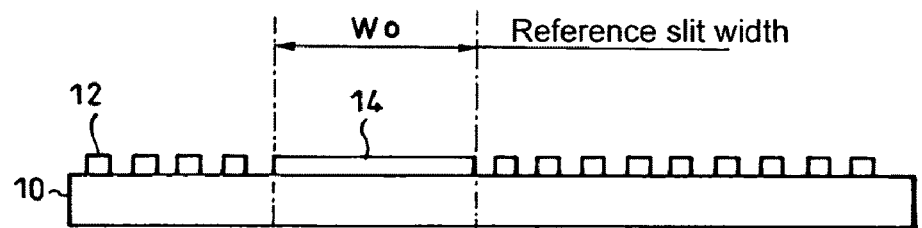
(a) Integrated grating structure
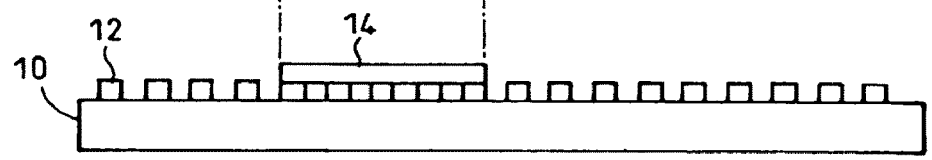
(b) Add-on structure Fig. 7
(a) Bottom view
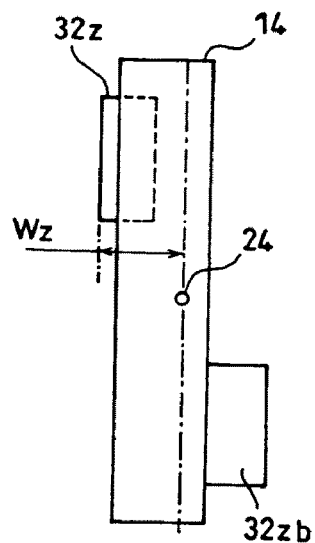
(b) Side view
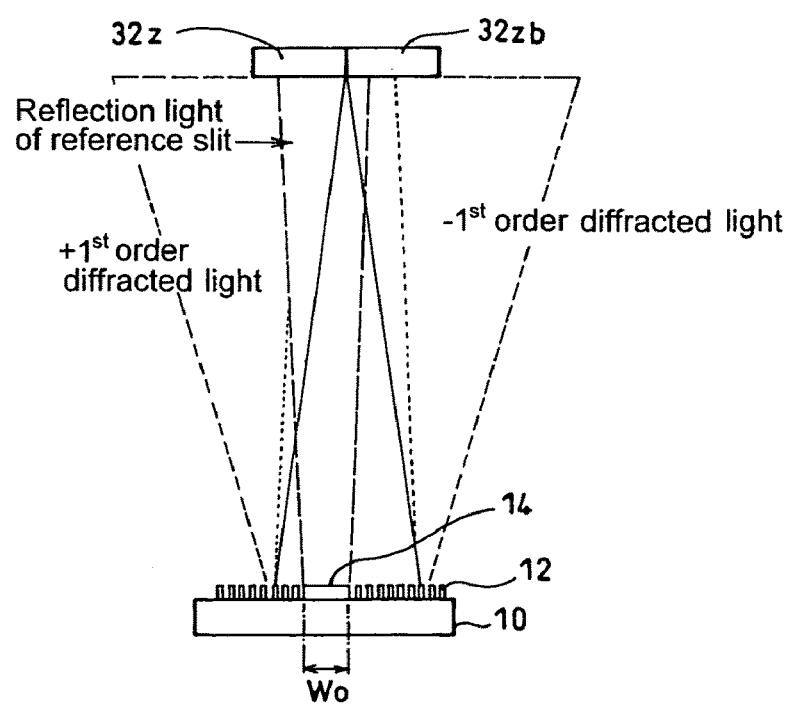

OPTICAL ENCODER COMPRISING A MAIN AND REFERENCE LIGHT RECEIVING PORTIONS WITH A THREE-PHASE SIGNAL GENERATION FOR DETECTING DISPLACEMENT AND DIRECTION OF DISPLACEMENT OF AN INCREMENTAL GRATING TRACK

CROSS-REFERENCE TO RELATED APPLICATION

The disclosure of Japanese Patent Application No. 2008-240216 filed on Sep. 19, 2008 including specifications, drawings and claims is incorporated herein by reference in its entirety.

BACKGROUND OF THE INVENTION

1. Field of the Invention

The present invention relates to an optical encoder, and in particular to an optical encoder, which is preferably used as a length measurement sensor such as a laser interferometer, etc., including: a main scale having an incremental track with a reflective phase grating formed along the length measurement direction; and a detection portion that is displaced relative to the main scale.

2. Description of the Related Art

In an incremental type optical encoder, it becomes difficult to separate a reference mark to detect a reference point from the incremental track of the main scale where the detector is downsized and the detection range is narrowed. Provisionally, even if the separation thereof is enabled in a minute range, it becomes difficult to set up (to adjust the alignment of) the detector, wherein the encoder performance is spoiled. Also, where the incremental track is separated from the reference mark so as to ensure the separation, it becomes difficult to configure the detector to a downsized scale.

In cases where the detector is configured to a downsized scale and is caused to have a reference detection feature, there has been provided a reference mark on the incremental track of the main scale. However, in this case, signals are subjected to fluctuation in the incremental detection at the reference mark portion, and incremental signals of the main scale are subjected to deterioration in the short range accuracy and a counting error, wherein it becomes difficult to synchronize the reference signal with the incremental signal.

As a countermeasure, European Patent Publication No. EP207121 (hereinafter, called Patent Document 1) and Japanese Translation of International Application (Kohyo) No. 2008-503745 (hereinafter, called Patent Document 2), etc., describe that the robustness is increased by a spatial filtering effect that attempts to average by widely taking the detection range.

However, since it is necessary to widely take the detection range in order to increase the averaging effect, it is difficult to downsize the detector. On the other hand, if the scale period is narrowed, the filtering effect is reduced. Also, since the incremental signal of the main scale is broken, there are problems that it becomes difficult to secure strict reference synchronization.

SUMMARY OF THE INVENTION

The present invention was developed to solve such problems in the prior art, and it is therefore an object thereof to enable the reference detection in a small-sized detector.

The present invention solves the problems by an optical encoder including a scale having an incremental track that has a reflective phase grating formed along the length measurement direction, and a detection portion that is displaced relatively to the scale, and the same optical encoder comprises:

a reference mark secured on the scale and composed of a reflection slit formed on at least one point of the incremental track;

a light irradiation portion that irradiates diffusion light to the scale, a main light receiving portion that is disposed at the surrounding centering around the light irradiation portion, receives interference fringes formed by the light irradiated from the light irradiation portion being diffracted by the scale, has four light receiving windows, which are related to each other so as to be disposed along the length measurement direction and to have a phase difference of 90 degrees, and so as to be disposed along the direction perpendicular to the length measurement direction and to have a phase difference of 180 degrees, and outputs incremental signals four phases of which are different from each other, and a pair of reference signal light receiving portions that are disposed in the direction perpendicular to the length measurement direction using the light irradiation portion as the center of point symmetry and output a reference signal that are secured at the detection portion; and a signal processing portion having a three-phase signal generation portion for generating three-phase signals having a phase difference of 90 degrees from the four incremental signals, a quadrature sine wave signals generation portion for generating a quadrature sine wave signals having a phase difference of 90 degrees by synthesizing the three-phase signals in terms of vectors, a direction judgment circuit for detecting edges by judging the direction of relative displacement of the detection portion to the main scale, an internal period counter for counting the periods of relative displacement, and a reference signal processing portion for generating a reference signal from the output of the reference signal light receiving portion.

Herein, the reference mark may be made into a reflection slit parallel to the phase grating of the incremental track, which is formed at an end portion detectable by a detection portion outside the range of length measurement of the incremental track.

Or, the reference mark may be made integral with the phase grating of the incremental track.

Or, the reference mark may be added on to the phase grating of the incremental track.

Further, the width of the reference mark may be made into one-fourth or less of the width of the main light receiving portion and may be made approximately half the width of the reference signal light receiving portion.

In addition, the light irradiating portion may be made into a point light source or a light source having a spatial filter.

Also, the light source may be made into a point light source consisting of a light projection optical fiber disposed at the center of an optical fiber cable and a spatial filter disposed at the light emission end thereof.

Further, the main light receiving portion may be disposed in the form of a square including a cross mark therein centering around the point light source.

Still further, the width Wd in the length measurement direction of the main light receiving portion, the opening width Wz in the length measurement direction of the reference signal light receiving portion, and the width $W_0$ in the length measurement direction of the reference mark may be set up so as to satisfy the following expression:

(¼)Wd > W₀

(½)Wz ≈ W₀

Also, the width in the length measurement direction of the reference mark may be made sufficiently greater than the period of the incremental track.

One of the main light receiving portions, which generates a period signal the phase of which differs by 180 degrees, may be disposed at a position shifted vertically to the length measurement direction.

Also, the signal processing portion may include a pulse interval detection circuit for detecting the interval between the reference pulse and a quadrature rectangular signal, and a circuit for varying a start-trigger position of the internal period counter by a detected pulse interval.

Also, the signal processing portion may include a delay circuit or line for the counter start order that delays by a multiple of phase difference of 90 degrees.

In addition, the signal processing portion may have a circuit for storing the light-receiving level of the reference signal.

According to the present invention, since the detection portion is not changed from the prior art incremental, configuration, the size of the detection portion can be downsized. Also, since quadrature sine wave signals are synthesized from incremental signals, it is possible to carry out incremental detection without producing any period counting error. Further, by using the reference mark formed in the incremental scale pattern and a direction judgment circuit for judging a direction and detecting edges, factors resulting in a lowering in the light quantity such as dust and stains and the reference mark can be distinguished from each other, where the robustness is increased. Further, a reference output can be enabled at a desired (optional) position synchronized with an incremental signal by using an internal period counter along with concurrent use of a lateral differential vector-synthesized method. Still further, since only addition of electric circuits is necessary without requiring any complicated modification of the optical system, it is possible to add a reference detection feature to a small-sized detector at a low cost, which has been impossible in the prior arts.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein;

FIG. 3 is a perspective view showing the structure of the scale according to Embodiment 1;

FIG. 4 is a sectional view showing an example of the structure of a grating and a slit according to Embodiment 1;

FIG. 7 is a view showing a reference detection portion according to Embodiment 1;

DETAILED DESCRIPTION OF THE PREFERRED EMBODIMENTS

A detailed description is given of embodiments of the present invention with reference to the following drawings.

Figure 1:
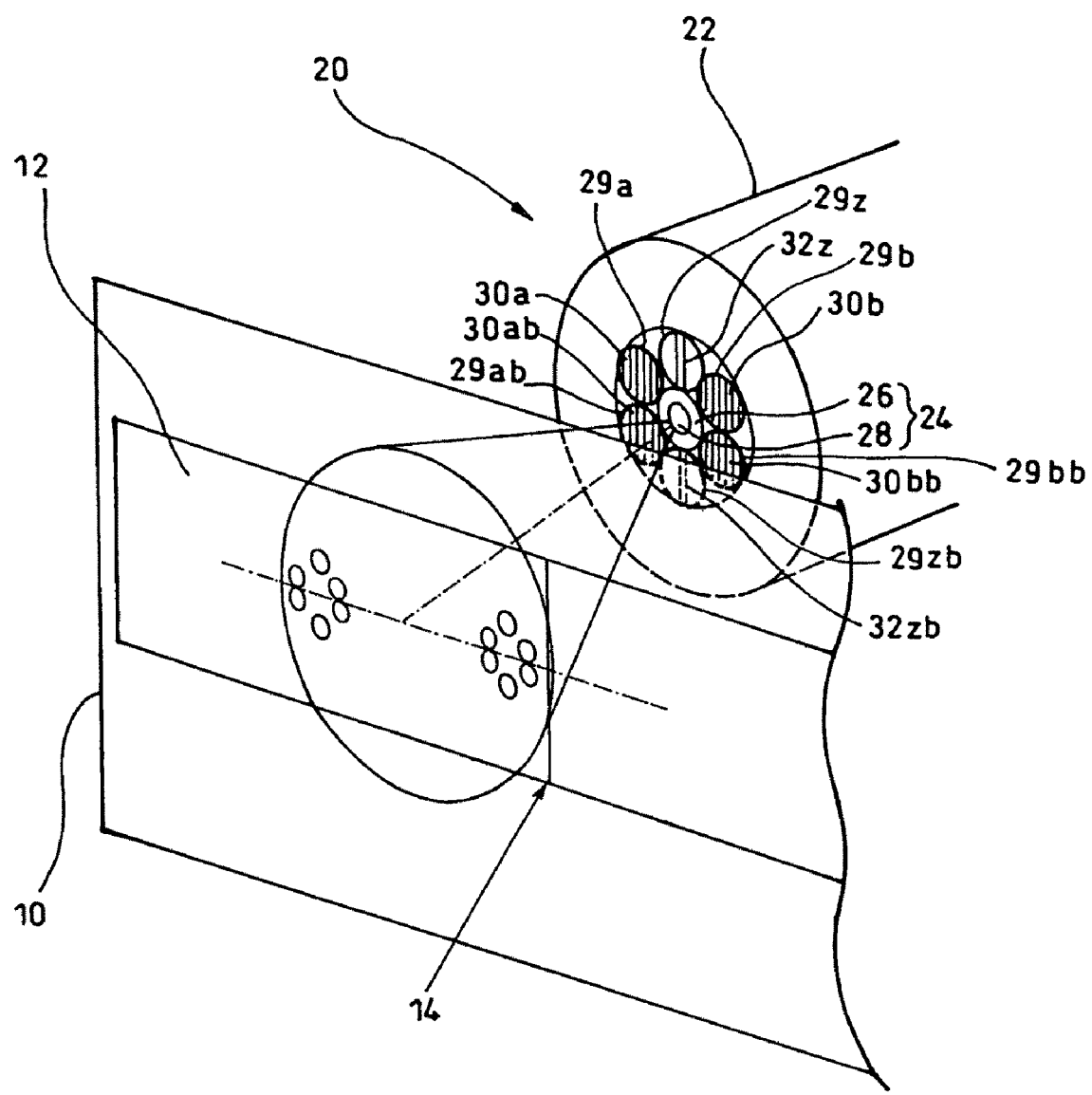
FIG. 1 is a perspective view showing the relationship between a scale and a detector in Embodiment 1 of the present invention.
Figure 2:
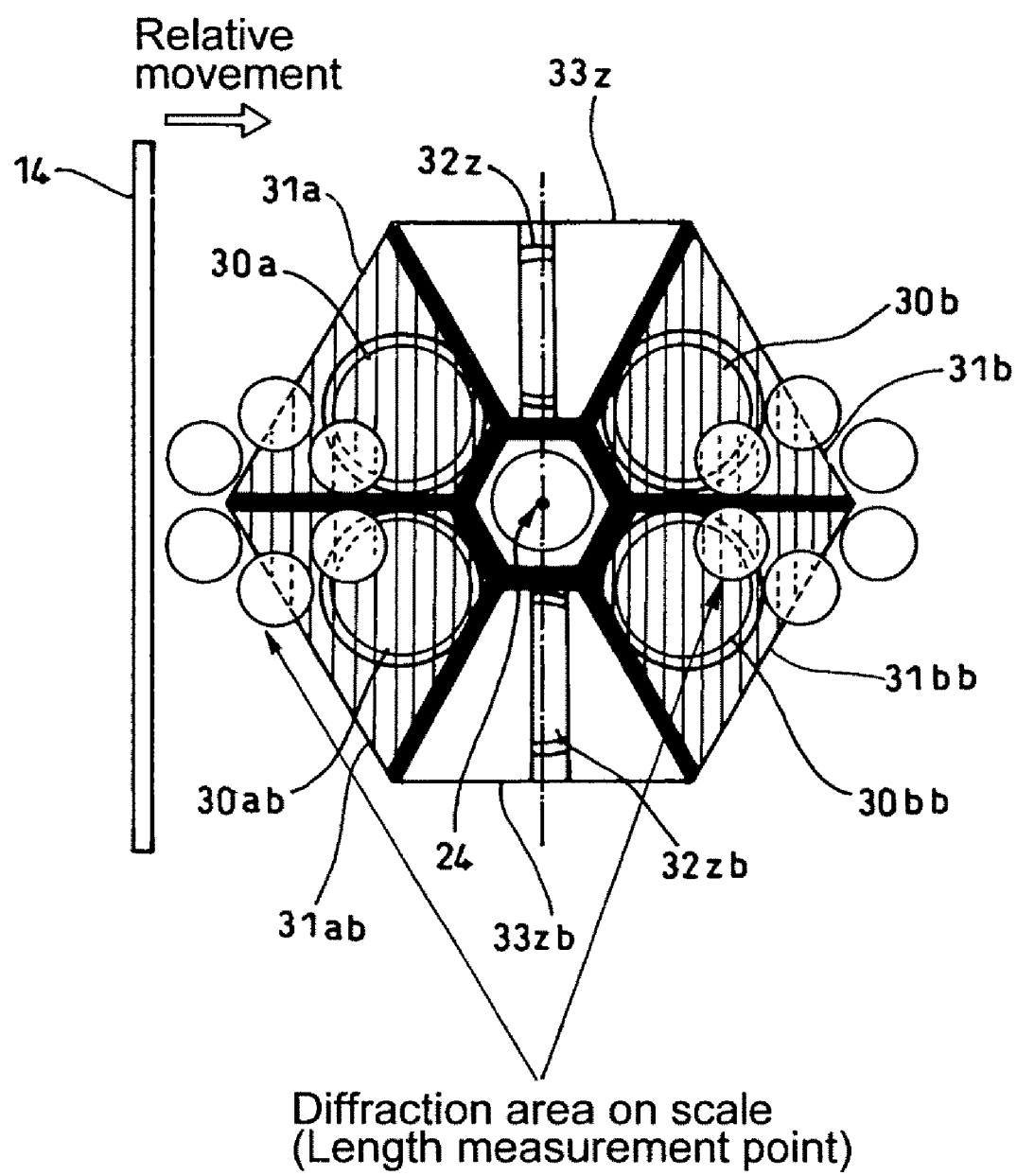
FIG. 2 is a plan view of Embodiment 1 of the present invention.

The configuration of scale 10 and detector 20 according to Embodiment 1 of the present invention is shown in FIG. 1 (Perspective view) and FIG. 2 (Plan view observed from the scale side).

As shown in detail in FIG. 3, the scale 10 includes incremental tracks 12 composed of a reflective phase grating and a reference mark 14 composed of a reflection slit parallel to the phase grating of the incremental track 12, which is formed at an end portion detectable by the detector 20 on at least one point of the incremental track 12, for example, outside the length measurement range. The corresponding a reference mark 14 may be made into an integrated grating structure as shown in, for example, FIG. 4(a), or may be made into an add-on structure as shown in FIG. 4(b). Here, the width $W_0$ of the reference mark 14 is approximately half the width Wz (Refer to FIG. 5) of light-receiving differential slits 33z, 33zb of the reference light receiving portions 32z, 32zb as shown in FIG. 2, and is a width required so that influence upon incremental detection may be suppressed to some extent. Also, the position of the reference mark 14 is not restricted to one point of the end portion of the scale 10 but the reference marks 14 may be provided by a plurality at optional positions where accurate incremental measurement is not required.

As shown in FIG. 1, the detector 20 includes a point light source 24 consisting of a light projection optical fiber 26 disposed, for example, at the center of an optical fiber cable 22 and a spatial filter 28 disposed at the light emission end thereof, main light receiving portions 30a, 30b, 30ab, and 30bb provided with index patterns 31a, 31b, 31ab, and 31bb, which are disposed in the form of a square having a cross therein centering around the corresponding point light source 24, detects interference fringes diffracted by the scale 10, and receives four ("a" phase of phase 0 degrees, "b" phase of phase 90 degrees, "ab" phase of phase 180 degrees and "bb" phase of phase 270 degrees) incremental phase differential signals, respectively, and a pair of reference signal light receiving portions 32z ("z" phase) and 32zb ("zb" phase)

disposed in the lengthwise direction of the reference mark with the point light source 24 made into the center of point symmetry.

The other end of the light projection optical fiber 26 is connected to a laser light source (not shown), and the other ends of the light-receiving optical fibers 29a, 29b, 29ab, 29bb, 29z and 29zb the incident ends of which are, respectively, the main light receiving portions 30a, 30b, 30ab, 30bb and the reference signal light receiving portions 32z and 32zb are connected to an optical detector (not illustrated).

Figure 5:
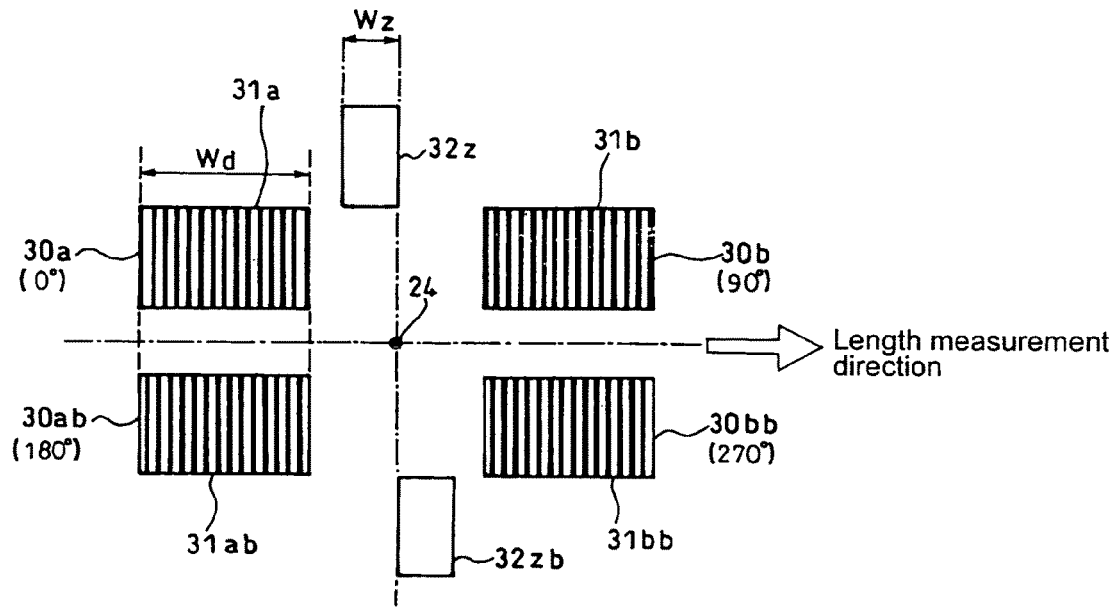
FIG. 5 is a plan view showing light-receiving arrangement of the detection portion according to Embodiment 1.

Here, as shown in detail in FIG. 5, with respect to the main light receiving portions 30a, 30b, 30ab and 30bb, the detection phases of the detection portions (30a and 30ab) and (30b and 30bb) in the lateral direction perpendicular to the length measurement direction have a phase difference of 180 degrees, with each other, and the detection portions (30a and 30b) and (30ab and 30bb) apart from each other in the length measurement direction have a phase difference of 90 degrees, with each other.

Here, where it is assumed that the width in the length measurement direction of respective phase light receiving portions 30a, 30b, 30ab and 30bb for (incremental) detection of diffraction interference fringes is Wd, and the opening width in the length measurement direction of the reference detection light receiving portions 32z and 32zb is Wz, the width $W_0$ in the length measurement direction of the reference mark (slit) is required to satisfy the following two conditions.

$$(\tfrac{1}{4})Wd > W_0 \quad (1)$$

That is, since the incremental signal detection area on the scale 10 is (½)Wd, the width capable of securing signals to some degree when the detector passes through the reference mark area is the half thereof or less.

$$(\tfrac{1}{2})Wz \approx W_0 \quad (2)$$

This is because the allowable range of alignment adjustment is widened so that it is comparatively hard for a fluctuation in the light receiving amount to be brought about even if the height of the detector changes.

It is desirable that the width $W_0$ of the reference mark is sufficiently greater (for example, by five to ten times) than the period of the incremental track 12.

Figure 6:
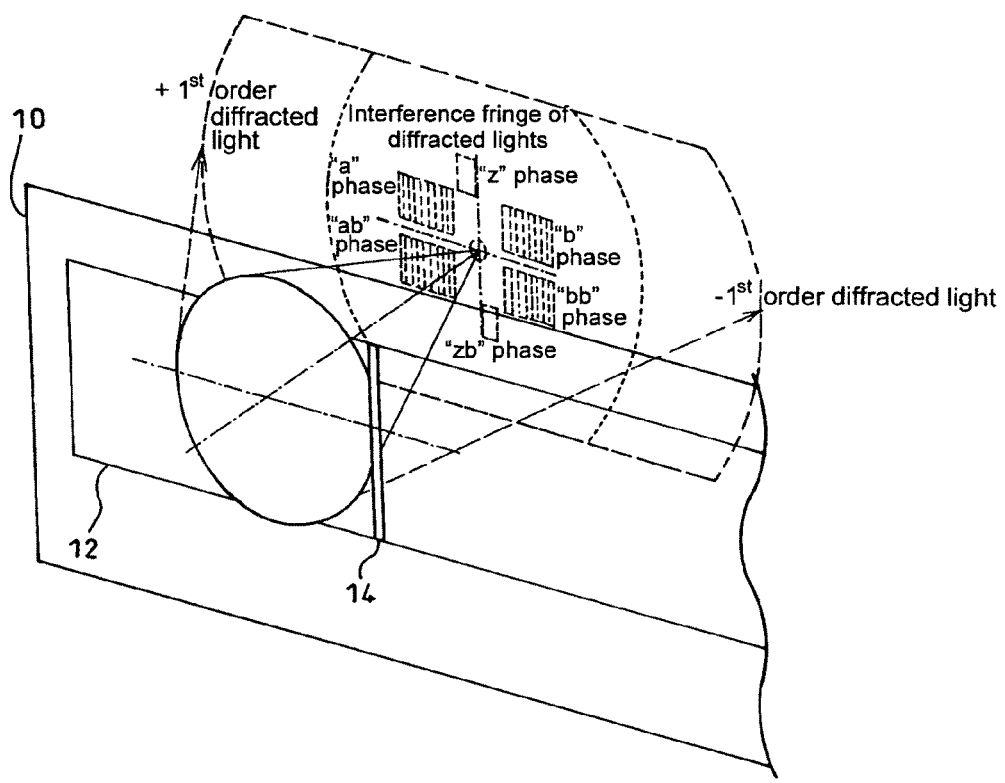
FIG. 6 is a perspective view according to Embodiment 1.

Radiation light irradiated from the point light source 24 is diffracted by the incremental track 12 as shown in FIG. 6, and forms interference fringes at the detection portion. The interference fringes are detected by the main light receiving portions 30a, 30b, 30ab and 30bb having respective phase differences. Also, reflection light reflected (zero-order diffracted) by the reference mark 14 is detected by the reference signal light receiving portions 32z and 32zb shifted and disposed in the length measurement direction.

Figure 8:
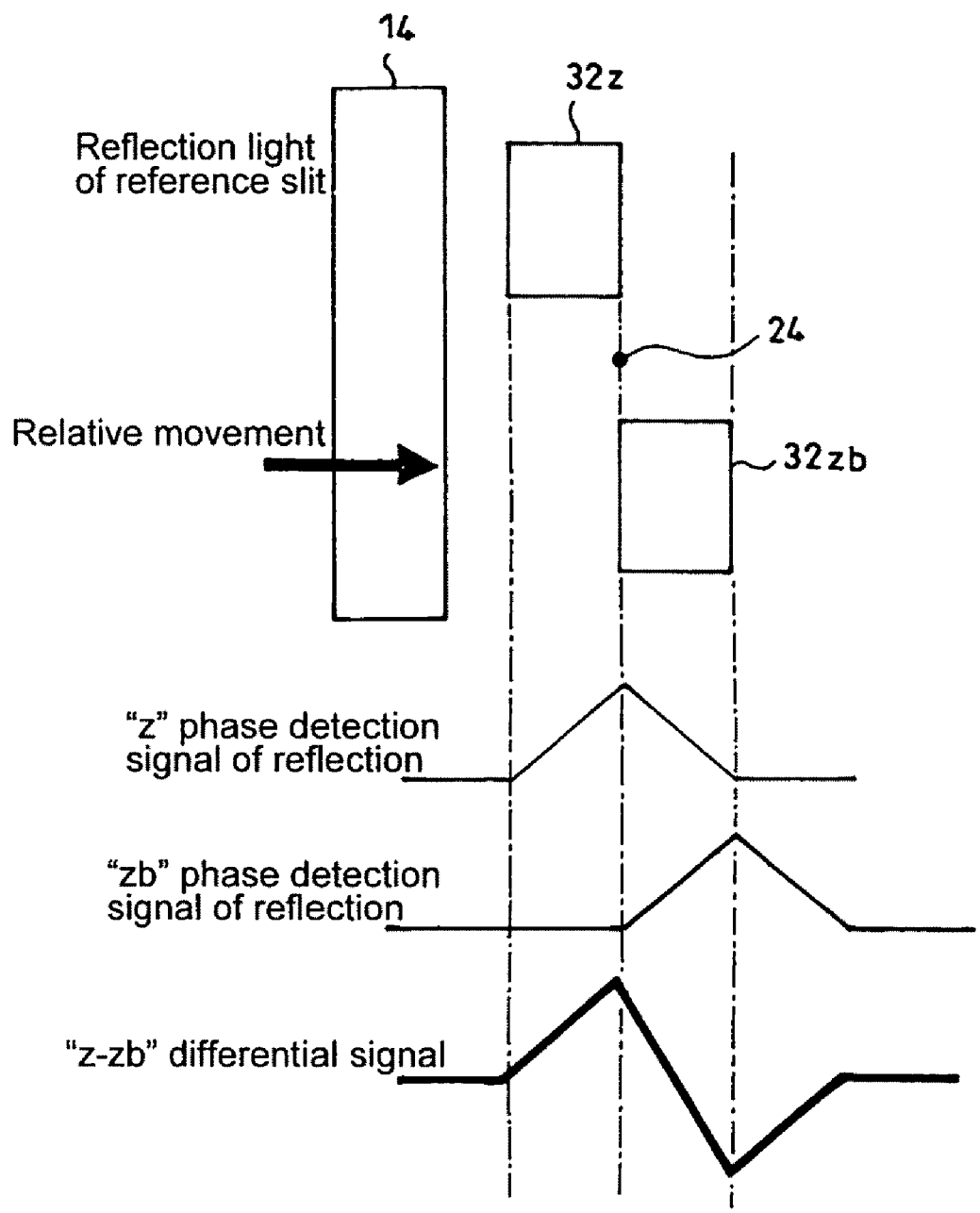
FIG. 8 is a view showing a reference mark detection signal according to Embodiment 1.

As shown in detail in FIG. 7(a) (Bottom view) and FIG. 7(b) (Side view), the reference signal light receiving portions 32z and 32zb are disposed so as to be opposed to the scale 10 so that they receive light by direct reflection (zero-order diffraction) with respect to the reference mark 14, and the differential light receiving portions are disposed in the point symmetry centering around the light source, and have the light receiving width Wz, which is greater by approximately two times than the width $W_0$ of the reference mark (slit), in the length measurement direction. The reference signal light receiving portions 32z and 32zb output signals as shown in FIG. 8 when detecting the reference mark 14. However, the light receiving portion signal includes direct current components of interference portion of diffracted lights from other than the reference mark 14.

Figure 9:
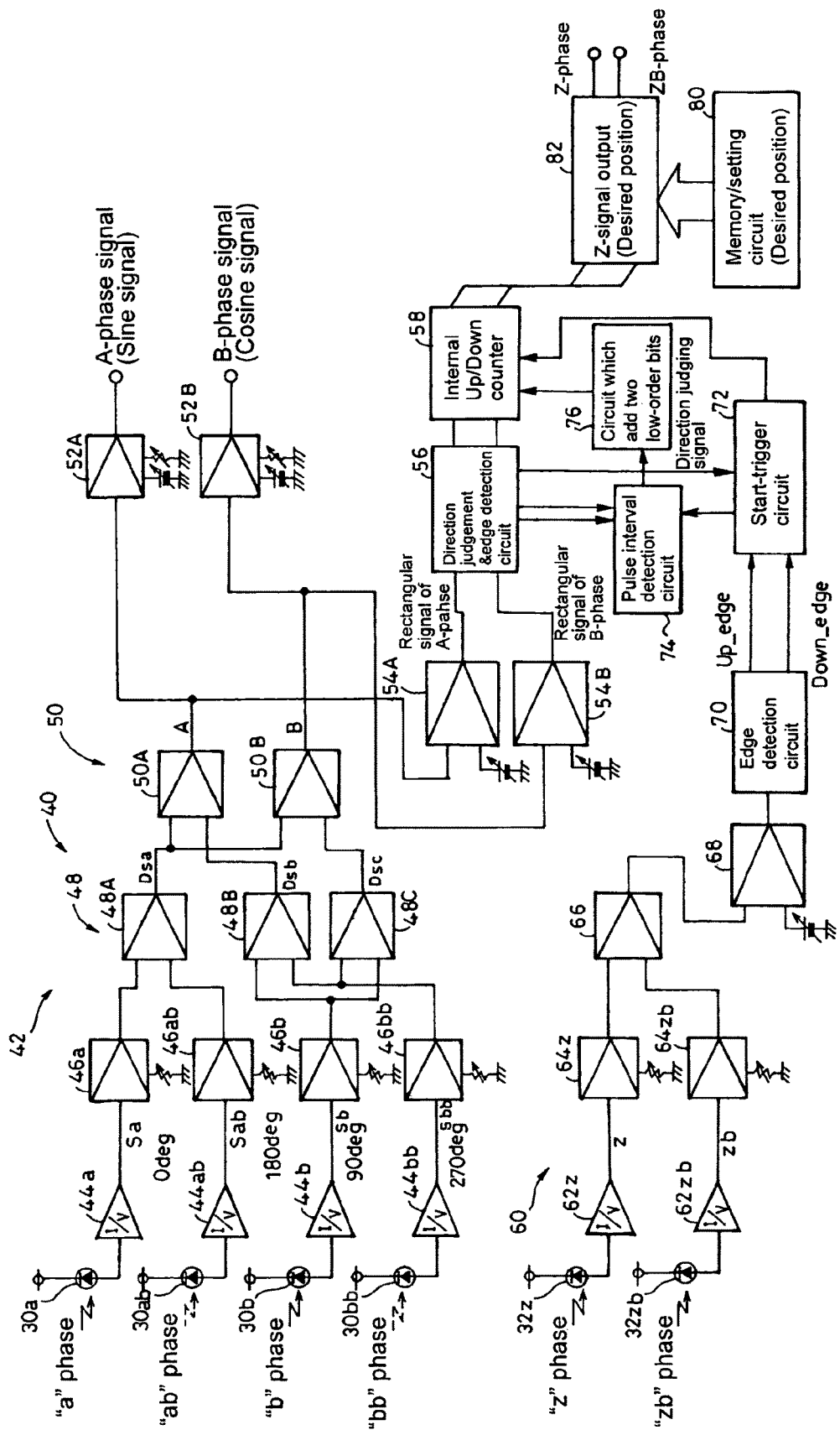
FIG. 9 is a block diagram showing a configuration of a signal processing portion according to Embodiment 1.

As shown in FIG. 9, the signal processing portion 40 includes an incremental signal processing portion 42 for processing incremental signals by lateral differential vector synthesization from output of the main light receiving portions 30a, 30ab, 30b and 30bb, a direction judgment circuit 56 for detecting the edges by judging the direction of relative displacement, an internal period counter 58 for counting the period of relative displacement, and a reference signal processing portion 60 for generating a reference signal from output of the reference signal light receiving portions 32z and 32zb.

The incremental signal processing portion 42 includes current-voltage converters 44a, 44ab, 44b, and 44bb provided per phase, amplifiers 46a, 46ab, 46b and 46bb, a three-phase signal generation portion 48 composed of three differential amplifiers 48A, 48B and 48C, a quadrature sine wave signals generation portion 50 composed of two vector-synthesized differential amplifier 50A and 50B, gain adjustment portions 52A and 52B for A phase and B phase, and comparators 54A and 54B for obtaining rectangular waves.

The reference signal processing portion 60 includes current-voltage converters 62z and 62zb, amplifiers 64z and 64zb, a differential amplifier 66 for generating a differential z-phase signal which is a zero cross signal by differentially amplifying the z phase and zb phase, a comparator 68 having a threshold generation portion, an edge detection circuit 70, a trigger circuit 72 for generating a start-trigger to commence counting, a pulse interval detection circuit 74 for detecting the interval between the reference detection pulse and the incremental 2-phase rectangular wave edge, a low-order 2-bit addition circuit 76 for adding low order 2 bits to the internal period counter 58, a memory/setting circuit 80 for designating a desired position of the reference signal from the periphery and storing the same therein, and a z-signal output circuit 82 for outputting a reference pulse at the designated position.

Hereinafter, a description is given of the actions thereof.

Figure 10:
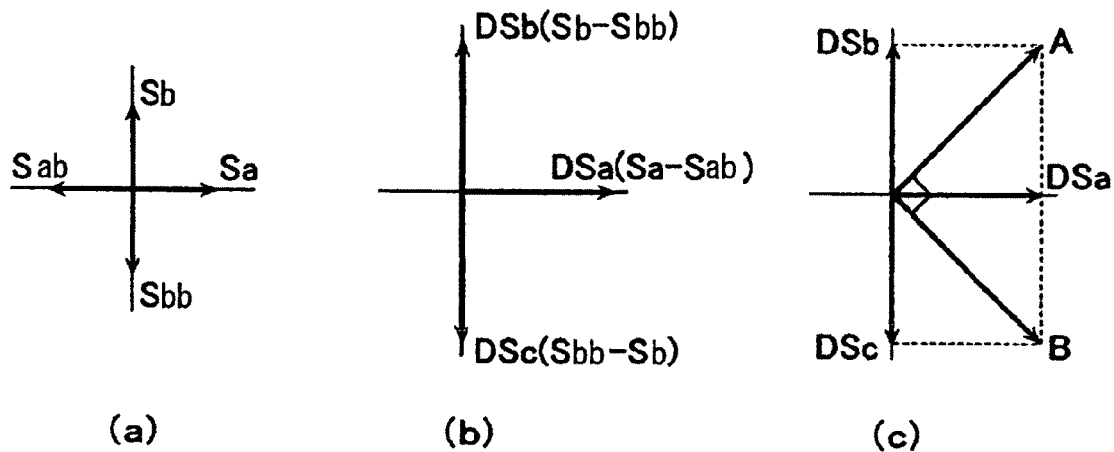
FIG. 10 is a vector diagram showing an example of signal processing according to Embodiment 1.

FIG. 10(a) is a vector diagram showing the relationship between the phases and intensities of period signals Sa, Sab, Sb and Sbb generated by the main light receiving portions 30a, 30ab, 30b and 30bb. Also, FIG. 10(b) shows the relationship between the phases and intensities of the signals DSa (=Sa−Sab), DSb (=Sb−Sbb), and DSc (=Sbb−Sb) generated in the three-phase signal generation portion 48. FIG. 10(c) shows the relationship between the phases and intensities of the signals A and B generated in the two-phase sinusoidal wave signal generation portion 50. Also, it is assumed here that no shift occurs in the phases of the respective period signals Sa, Sb, Sab and Sbb.

As described above, the main light receiving portions 30a, 30ab, 30b and 30bb generate period signals Sa, Sab, Sb and Sbb. The period signals Sa and Sab are input into the differential amplifier 48A of the three-phase signal generation portion 48 via the current-voltage converters 44a and 44ab and the amplifiers 46a and 46ab in FIG. 9. The differential amplifier 48A differentially amplifies both input signals Sa and Sab and outputs the first differential signal DSa. The first differential signal DSa is brought about by a difference between the period signal Sa having a phase of 0 degrees and the period signal Sab having a phase of 180 degrees, and if there is no shift in phase between the period signals Sa and Sab, the first differential signal has the same phase of 0 degrees as the reference phase.

Similarly, the period signals Sb and Sbb are input into the differential amplifier 48B of the three-phase signal generation portion 48 via the current-voltage converters 44b and 44bb and the amplifier 46b and 46bb. The differential amplifier 48B differentially amplifies both input signals Sb and Sbb and outputs the second differential signal DSb. The second differential signal DSb is brought about by a difference between the period signal Sb having a phase of 90 degrees and the period signal Sbb having a phase of 270 degrees, and if there is no shift in phase between the period signals Sb and Sbb, the second differential signal has a phase difference of 90 degrees with respect to the reference phase.

Further, the period signals Sb and Sbb are also input into the differential amplifier 48C of the three-phase signal generation portion 48 via the current-voltage converters 44b and 44bb and the amplifiers 46a and 46bb. The differential amplifier 48C differentially amplifies both input signals Sb and Sbb as in the differential amplifier 48B. However, the output signal DSc is obtained as an inverted differential signal the phase of which is different by 180 degrees from the second differential signal DSb. That is, the inverted differential signal DSc has a phase difference of 270 degrees (that is, −90 degrees) with respect to the reference signal. As shown in FIG. 10(b), the three-phase signals DSa, DSb and DSc obtained by the three-phase signal generation portion 48 have a phase difference of 90 degrees, respectively.

After that, the first differential signal DSa and the second differential signal DSb are input into the differential amplifier 50A that the quadrature sine wave signal generation portion 50 has. The differential amplifier 50A generates an A-phase signal by synthesizing the vectors of the input two signals DSa and DSb. Since the vector of the signal DSa of 0-degree phase and the vector of the signal DSb of 90-degree phase are synthesized, the A-phase signal becomes a signal having a phase difference of 45 degrees with respect to the reference phase.

Similarly, the first differential signal DSa and the inverted differential signal DSc are input into the differential amplifier 50B that the quadrature sine wave signal generation portion 50 has. The differential amplifier 50B generates a B-phase signal by synthesizing the vectors of the input two signals DSa and DSb. Since the vector of the signal DSa of 0-degree phase and the vector of the signal DSc of 270-degree (−90-degrees) phase are synthesized as in the A-phase signal, the B-phase signal becomes a signal having a 315-degree (that is, −45-degrees) phase with respect to the reference phase. Thus, since the A-phase signal and B-phase signal that have been obtained have a phase difference of 90 degrees, the intensities thereof are equal to each other (Refer to FIG. 10(c)).

Figure 11:
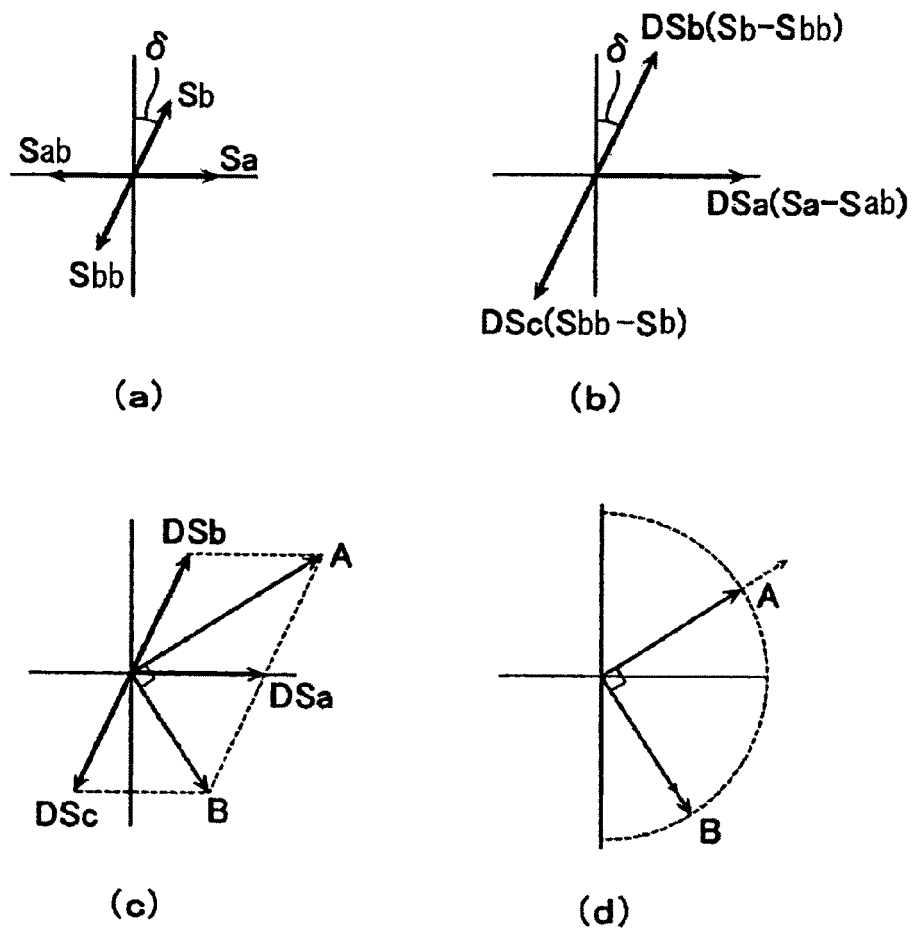
FIG. 11 is a vector diagram showing another example of the signal processing.

Next, a description is given of a case where the period signals Sb and Sbb are subjected to a phase shift with respect to the period signals Sa and Sab. Generally, in an optical encoder, there may be cases where a phase shift occurs in the output signal (period signal) due to the position of the light source and an error in the scale grating of the main scale, etc. FIG. 11(a) is a vector diagram in a case where, although the period signals Sb and Sbb idealistically have a phase difference of 90 degrees with respect to the period signals Sa and Sab, the period signals Sb and Sbb further have a shift of phase difference δ from 90 degrees. FIG. 11(b) shows the relationship between the phase and intensity of the three-phase differential signals DSa through DSc generated in the three-phase signal generation portion 48. FIG. 11(c) shows the relationship between the phase and intensity of signals generated in the quadrature sine wave signal generation portion 50.

The respective period signals Sa through Sbb are input in the differential amplifiers 48A through 48C of the three-phase signal generation portion 48 as described above, and the differential signals DSa through DSc are output. Here, the second differential signal DSb does not take a phase difference of 90 degrees because it has a phase shift δ with respect to the first differential signal DSa, but will have a phase difference of (90−δ) degrees with respect to the first differential signal DSa. The inverted differential signal DSc generated by the differential amplifier 48C is brought about by inverting the second differential signal DSb. Therefore, it has a phase difference of 180 degrees from the second differential signal DSb, since the inverted differential signal DSb, and has a phase shift δ with respect to the first differential signal DSa as in the second differential signal DSb. Therefore, it will have a phase difference of (270−δ) degrees with respect to the first differential signal DSa.

As shown in FIG. 11(b), the three-phase differential signals DSa through DSc obtained in the three-phase signal generation portion 48 do not have a phase difference of 90 degrees among themselves but include a phase shift δ, since the period signals Sc and Sd have a phase shift δ.

After that, the first differential signal DSa and the second differential signal DSb of the three-phase differential signals DSa through DSc having a phase shift δ are input into the differential amplifier 50A of the quadrature sine wave signal generation portion 50 and are synthesized in terms of vector. Therefore, as shown in FIG. 11(c), an A-phase signal is obtained. Since the processing in the quadrature sine wave signal generation portion 50 is synthesization in terms of vectors, the phase of the A-phase signal will be (45−δ/2) degrees.

Also, since the first differential signal DSa and the inverted differential signal DSc are similarly input into the differential amplifier 50B of the quadrature sine wave signal generation portion 50 and are synthesized in terms of vectors, a B-phase signal is obtained. Here, the phase of the B-phase signal becomes (135−δ/2) degrees.

The two-phase signals A and B thus obtained will have a phase shift of 90 degrees even if a phase shift is brought about in the original period signals Sa through Sd. That is, even where the period signals Sa through Sd have a phase shift, it is possible to obtain the A-phase signal and the B-phase signal having a phase difference of 90 degrees without adjusting the phase (Refer to FIG. 11(c)).

Since the process to generate two-phase signals A and B having a phase difference of 90 degrees in the quadrature sine wave signal generation portion 50 is synthesization in terms of vectors, the signal intensities of the two-phase signals A and B are different from each other as shown in FIG. 11(c). In this case, by adjusting the gains of the respective signals A and B by means of the gain adjustment portions 52A and 52B after the two-phase signals A and B are generated in the quadrature sine wave signal generation portion 50, it is possible to generate the A-phase signal and B-phase signal that have a phase difference of 90 degrees and equal intensity as shown in FIG. 11(d).

Next, a description is given of a case where the light receiving amounts of the main light receiving portions 30a, 30b, 30ab and 30bb change due to existence of a fault and unevenness, etc., in the incremental track 12 of the scale 10 and generation of dynamic pitching fluctuations when being moved for length measurement, and the intensities of the period signals Sa, Sb, Sab and Sbb output from the main light receiving portions 30a, 30b, 30ab and 30bb deteriorate.

In general optical encoders, there may be cases where the main light receiving portion that generates signals the phase of which differs by 180 degrees is disposed on a diagonal line passing through the irradiation position of the light source in the light receiving portion. For example, there may be a case where the main light receiving portion 30a that generates the period signal Sa having the reference phase (0 degrees) is disposed at the "a" phase position in FIG. 5, the main light receiving portion 30ab that generates the period signal Sab having the phase 180 degrees is disposed at the "bb" phase position, and also, the main light receiving portion 30b that generates the period signal Sb having the phase difference 90 degrees is disposed at the "b" phase position, and the main light receiving portion 30bb that generates the period signal Sbb having the phase difference 270 degrees is disposed at the "ab" phase position.

If there exist fault and pitching fluctuations on the incremental track 12 of the scale 10, the signals only at one side (for example, the left side of the square including a cross mark therein in FIG. 5) of the main light receiving portion disposed centering around the light source deteriorates with respect to the signals output from the light receiving portion.

Figure 12:
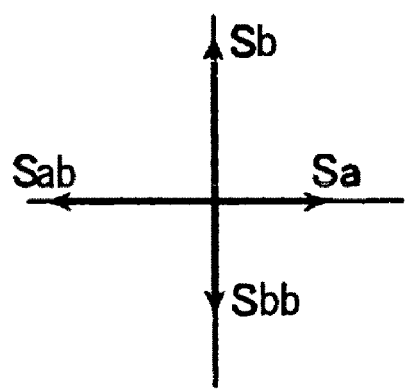
FIG. 12 is a vector diagram showing an example of a signal by a prior art optical encoder.

FIG. 12 shows the relationship between the phase and intensity in the case where the period signals Sa and Sbb of the period signals Sa, Sb, Sab and Sbb deteriorate in the general photoelectric encoder described above. In the general photoelectric encoder, the period signal Sa having a phase of 0 degrees deteriorates since a fault, etc., in the incremental track 12 adversely influence the main light receiving portion 30a that generates a period signal having a phase of 0 degrees. Similarly, the period signal Sbb having a phase of 270 degrees deteriorates since a fault, etc., adversely influence the main light receiving portion 30bb that generates a period signal having a phase of 270 degrees.

Figure 13:
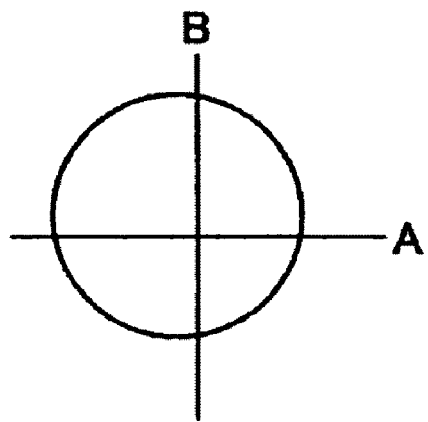
FIG. 13 is a view showing a Lissajous waveform of the example of a signal by a prior art optical encoder.

FIG. 13 shows a Lissajous signal based on two signals A and B having a phase difference of 90 degrees after the signal has been processed, in the case where the period signals Sa and Sbb generated by a one-sided light receiving portion deteriorate in the general optical encoder. A DC fluctuation is brought about in two signals having a phase difference of 90 degrees, which are generated based on the period signal in which one of a pair of signals for executing a differential amplification process deteriorates. Therefore, the center of the Lissajous shape will shift. The short range accuracy deteriorates due to generation of the DC fluctuation, and this adversely influences measurement of the optical encoder.

On the contrary, in the present embodiment, the main light receiving portions to generate period signals the phase of which is different by 180 degrees, of the main light receiving portions 30a, 30b, 30ab and 30bb, are disposed at a position shifted vertically to the length measurement direction. Therefore, even if a fault and a pitching fluctuation are brought about in the incremental track 12 of the scale 10 and adversely influence the two main light receiving portions atone side (for example, the main light receiving portions 30a and 30ab in FIG. 5), signals that are processed for differential amplification are simultaneously subjected to deterioration, wherein no DC fluctuation occurs.

FIG. 14(a) shows the phase and intensity of respective period signals Sa, Sb, Sab and Sbb generated in the main light receiving portions 30a, 30b, 30ab and 30bb where a part of the incremental track 12 is subjected to a fault, etc. FIG. 14(b) shows the phase and intensity of differential signals DSa through DSc generated from the respective period signals Sa, Sb, Sab and Sbb. FIG. 14(c) shows the relationship between the phase and intensity of the signals A and B generated in the quadrature sine wave signal generation portion 50. Here, a description and illustration are based on assumption that the period signals Sb and Sbb have a phase shift δ with respect to the period signals Sa and Sab.

The period signals Sa and Sab deteriorate by the above-described reason in the main light receiving portions 30a and 30ab in the present embodiment (Refer to FIG. 14(a)). The first differential signal DSa, which is generated from the period signals Sa and Sab in the three-phase signal generation portion 48, is also subjected to deterioration. On the contrary, the period signals Sb and Sbb output from the main light receiving portion 30b and 30bb do not deteriorate. The second differential signal DSb and the inverted differential signal DSc, which are generated from the period signals Sb and Sbb in the three-phase signal generation portion 48, do not deteriorate (Refer to FIG. 14(b)).

Figure 14:
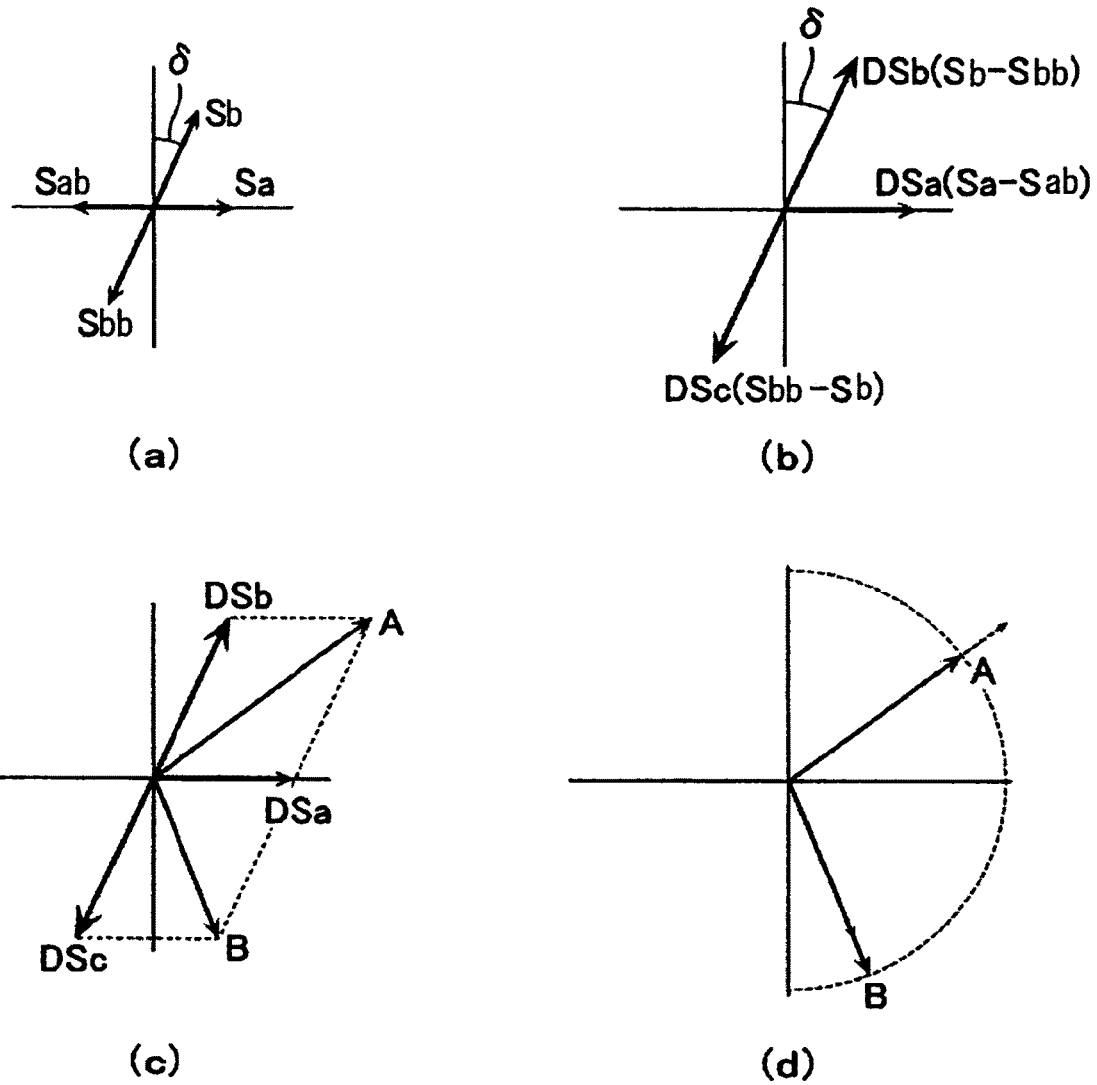
FIG. 14 is a vector diagram showing another example of signal processing according to Embodiment 1.

Since the three-phase differential signals DSa through DSc output from the three-phase signal generation portion 48 have a phase shift δ, respectively, and the first differential signal DSa is subjected to deterioration, the intensity of the signal may differ from the others (Refer to FIG. 14(b)). If the three-phase differential signals DSa through DSc are input in the quadrature sine wave signal generation portion 50 and are synthesized in terms of vectors, the A-phase signal and B-phase signal the phase difference of which is not 90 degrees are output as output as shown in FIG. 14(c). After that, the A-phase signal and B-phase signal are adjusted with respect to the gains thereof in the gain adjustment portions 52A and 52B, and will have equal intensities (Refer to FIG. 14 (d)).

Figure 15:
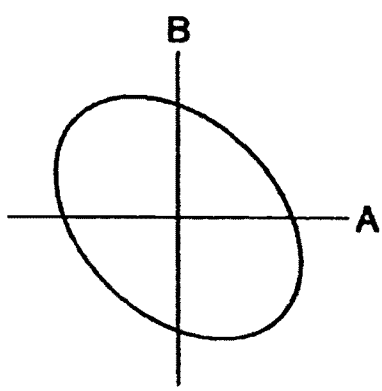
FIG. 15 is a view showing a Lissajous waveform of another example of the same signal processing.

FIG. 15 shows Lissajous signals based on the two-phase signals A and B having a phase difference of 90 degrees, which are generated in the present embodiment. Although the Lissajous shape shown in FIG. 15 becomes elliptical because the phase difference of the generated A-phase signal and B-phase signal is not 90 degrees, there is no case where the center thereof shifts.

In cases where the period signals deteriorate due to a fault, unevenness, and pitching fluctuations existing in the incremental track 12 of the scale 10, the two-phase signal generated by the optical encoder according to the present embodiment does not have an accurate phase difference of 90 degrees. However, in comparison with DC fluctuations generated by a set of light receiving portions for carrying out conventional differential processing being disposed diagonally centering around the light source, deterioration (error) in short range accuracy for detection by the two-phase signal having a phase difference, which is obtained by the optical encoder according to the present embodiment, is half or less. For this reason, the optical encoder according to the present embodiment is effective where a fault or pitching fluctuations are brought about in the incremental track 12 of the scale 10.

Thus, the optical encoder according to the present embodiment adjusts the signals by using vector synthesization for processing of the signals. The three-phase signal having a phase difference will accurately have a phase difference of 90 degrees in the processing step. Therefore, in the three-phase signal having a phase difference, it is possible to obtain two-phase signals of a desired phase difference of 90 degrees without making any phase adjustment operation using a variable resistor, etc. Also, the optical encoder according to the present embodiment is effective where the period signals are subjected to deterioration due to a fault, unevenness existing in the incremental track of the scale and pitching fluctuations.

As described above, since the A-phase signal and B-phase signal each having a phase difference of 90 degrees, which are obtained by the optical encoder according to the present embodiment, synthesizes three-phase differential signals DSa through DSc in terms of vectors in the quadrature sine wave signal generation portion 50, the signal intensities will become approximately $\sqrt{2}$ times, thereby improving the signal to noise ratio by 3 dB.

Also, by adjusting the gains of the signals in the gain adjustment portions 52A and 52B, it is possible to obtain 2-phase signals having a phase difference of 90 degrees, the intensities of which are equal to each other, after the vectors are synthesized.

Figure 16:
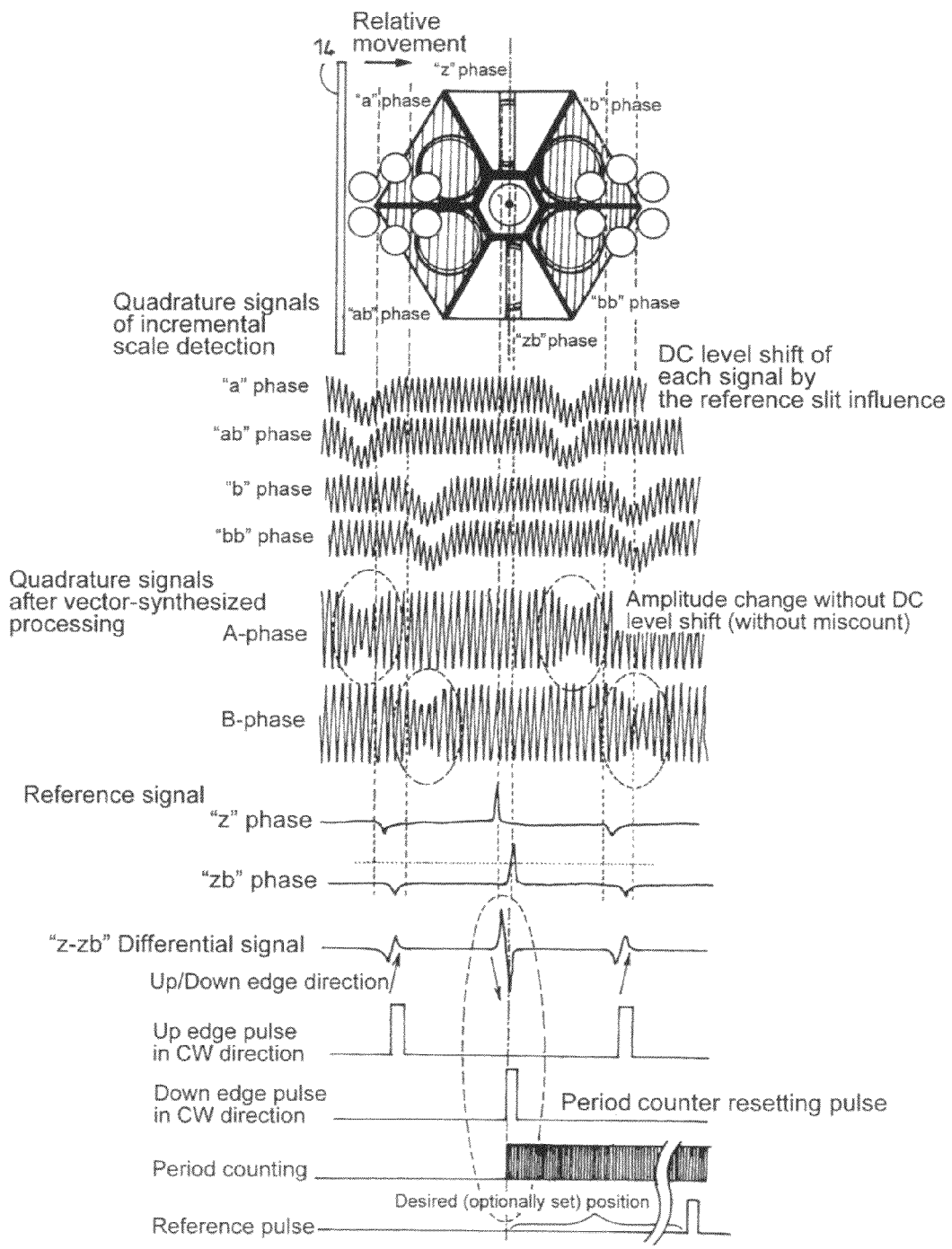
FIG. 16 is a view showing a flow of reference detection according to Embodiment 1.

Next, a description is given of a reference detection method with reference to FIG. 16.

A signal fluctuation occurs in the respective light receiving portions in accordance with relative movement of the reference mark 14. As shown in FIG. 16, the main light receiving portions 30a and 30ab are influenced by direct reflection with respect to the relative movement direction (the cw direction in the drawing), and interference fringe light-receiving fluctuations occur. Next, the z phase (zb phase) disposed between the "a" phase ("ab" phase) and the "b" phase ("bb" phase) is influenced by a lowering in the diffraction light amount, where the signals are lowered.

As already described above, even if being subjected to fluctuations in the light receiving amount, the quadrature sine waves does not fluctuate to such a degree that a counting error occurs. Also, since the purity of the signals is lowered, it is difficult to strictly measure the length by interpolation when passing through the slits.

As the reference mark 14 comes to the position opposed to the "z" phase light receiving portion 32z, the light receiving amount is increased by a direct reflection component. In a differential signal (Differential "z" phase signal) with the "zb" phase disposed at a shifted position, the edge directions of the differential "z" phase signal differ from each other in fluctuations before and after passing through the reference detection portion and in fluctuations when passing therethrough (in the case of FIG. 16, the former brings about an up edge, and the latter brings about a down edge). Therefore, it becomes possible to detect the origin at the direct reflection position of the reference mark.

Next, the internal period counter 58 of incremental signals is reset at a down edge pulse of the differential "z" phase signal to start period counting, and a reference pulse is output from the "z" signal output circuit 82 in synchronization with the period counting at a desired (optional) position, where no light-receiving fluctuation occurs, sufficiently after the edge pulse, set by the memory/setting circuit 80.

Therefore, it becomes possible to output a reference pulse at an optional position in synchronization with an incremental signal.

Since the increase and decrease direction of the differential "z" phase signal is reversed where dust exists, discrimination will be easily enabled if the moving direction is understood.

Figure 17:
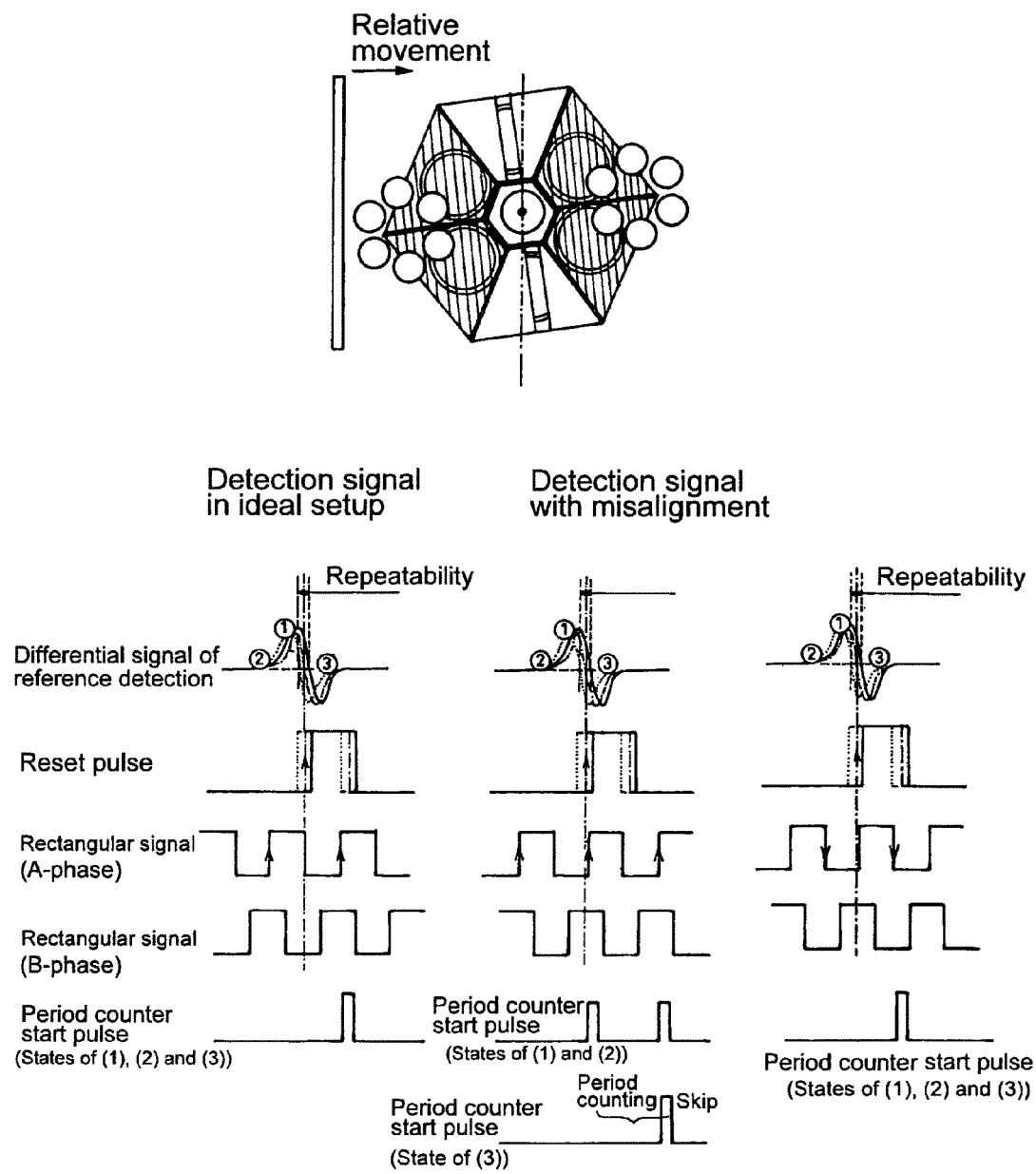
FIG. 17 is a view showing a case where the detection portion is inclined by mounting, according to Embodiment 1.

Further, the present embodiment has a function of preventing skipping of periods due to fluctuations in the reset position and securing repeatability of a reset pulse of reference detection by adding a pulse interval detection circuit 74 for detecting the interval between the reference detection pulse and the incremental two-phase rectangular wave edge and a low-order 2-bit addition circuit 76 for adding two bits in the low order to the internal period counter 58. That is, as shown in FIG. 17, where the detection portion is tilted by mounting, there may be a case where the counting period skips. Therefore, by shifting the period by half by adding two bits to the low order of the counter (¼ period counter), the counting is carried out at the down edge, wherein repeatability can be improved. Theoretically, with the repeatability <±½ periods, the repeatability of the reference pulse (optional position) can be secured. Thus, by compensating for deterioration in the reference detection repeatability due to mounting, the repeatability can be improved.

Figure 18:
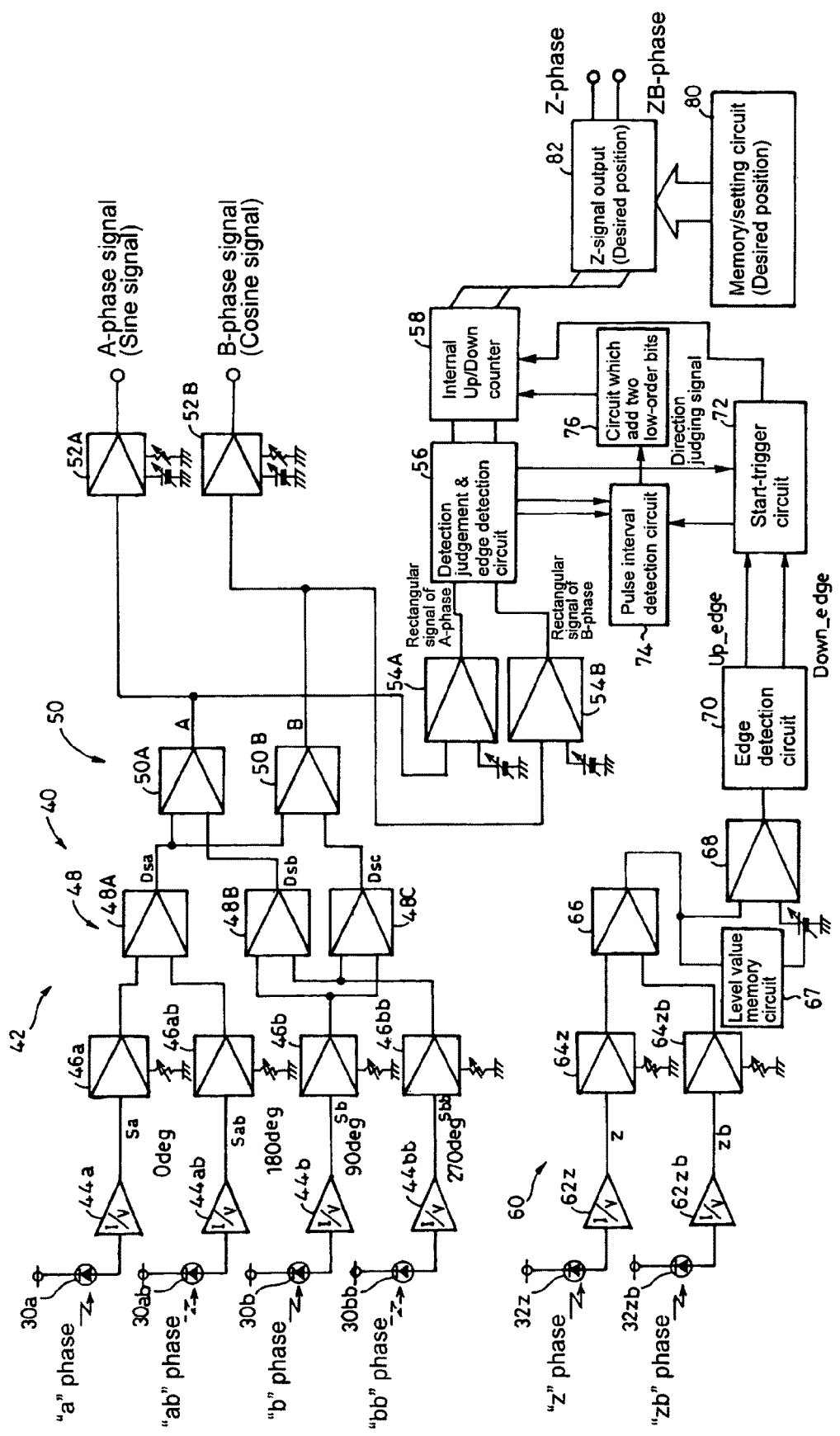
FIG. 18 is a block diagram showing a configuration of a signal processing portion according to Embodiment 2 of the present invention.

In addition, as in Embodiment 2 shown in FIG. 18, where a level value memory circuit 67 is provided in the output of the above-described "z" phase/"zb" phase differential amplifier 66, and the level is used for the judgment level of the comparator 68, it will be possible to further accurately detect the reference regardless of deterioration in the light source, changes in the reflection ratio due to staining on the surface and/or oxidation.

Also, in the above-described embodiments, although optical fibers are used for the detector, the present invention is applicable not only to the same but also to a configuration of the detector composed of, for example, a light-emitting diode and a photodiode or a photodiode array, etc.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An optical encoder including a scale having an incremental track that has a reflective phase grating formed along length measurement direction, and a detection portion that is displaced relatively to the main scale, comprising:
a reference mark secured on the scale and composed of a reflection slit formed on at least one point of the incremental track;
a pair of reference signal light receiving portions having a light irradiation portion that irradiates light to the scale, a main light receiving portion that is disposed at the surrounding centering around the light irradiation portion, receives interference fringes formed by the light irradiated from the light irradiation portion being diffracted by the main scale, has four light receiving windows, which are related to each other so as to be disposed along the length measurement direction and to have a phase difference of 90 degrees, and so as to be disposed along the direction perpendicular to the length measurement direction and to have a phase difference of 180 degrees, and outputs incremental signals four phases of which are different from each other, and the pair of reference signal light receiving portions being disposed in the direction perpendicular to the length measurement direction using the light irradiation portion as the center of point symmetry and output a reference signal which are secured at the detection portion; and
a signal processing portion having a three-phase signal generation portion for generating three-phase signals having a phase difference of 90 degrees from the four incremental signals, quadrature sine wave signals generation portion for generating quadrature sine wave signals having a phase difference of 90 degrees by synthesizing the three-phase signals in terms of vectors, a direction judgment circuit for detecting edges by judging the direction of relative displacement of the detection portion to the main scale, an internal period counter for counting the periods of relative displacement, and a reference signal processing portion for generating a reference signal from the output of the reference signal light receiving portion.

2. The optical encoder according to claim 1, wherein the reference mark is composed of a reflection slit that is parallel to the phase grating of the incremental track and is formed at an end portion detectable by the detection portion outside the range of length measurement of the incremental track.

3. The optical encoder according to claim 2, wherein the reference mark is structured to be integral with the phase grating of the incremental track.

4. The optical encoder according to claim 2, wherein the reference mark is added on to the phase grating of the incremental track.

5. The optical encoder according to claim 1, wherein the width of the reference mark is one-fourth or less of the width of the main light receiving portion, and is approximately half the width of the reference signal light receiving portion.

6. The optical encoder according to claim 1, wherein the light irradiation portion is a point light source or a light source having a spatial filter.

7. The optical encoder according to claim 6, wherein the light source is a point light source composed of a light projection optical fiber disposed at the center of an optical fiber cable and a spatial filter disposed at the emission end thereof.

8. The optical encoder according to claim 7, wherein the main light receiving portion is disposed in the form of a square including a cross mark therein centering around the point light source.

9. The optical encoder according to claim 1, wherein the width Wd in the length measurement direction of the main light receiving portion, the opening width Wz in the length measurement direction of the reference signal light receiving portion and the width $W_0$ in the length measurement direction of the reference mark satisfy the relationship of the following expressions:

$$(1/4)Wd > W_0$$

$$(1/2)Wz \approx W_0$$

10. The optical encoder according to claim 1, wherein the width in the length measurement direction of the reference mark is sufficiently greater than the period of the incremental track.

11. The optical encoder according to claim 1, wherein one of the main light receiving portions, which generates a period signal the phase of which differs by 180 degrees, is disposed at a position shifted vertically to the length measurement direction.

12. The optical encoder according to claim 1, wherein the signal processing portion includes:
  a pulse interval detection circuit for detecting the interval between the reference pulse and a rectangular signal having a phase difference of 90 degrees; and
  a circuit for varying a start-trigger position of the internal period counter by the detected pulse interval.

13. The optical encoder according to claim 1, wherein the signal processing portion includes a delay circuit or line for the counter start order that delays by a multiple of the phase difference of 90 degrees.

14. The optical encoder according to claim 1, wherein the signal processing portion includes a circuit for storing the light receiving level of the reference signal.

* * * * *